R. W. GATES.
Upsetting Tires.
No. 16,331.  Patented Jan. 6, 1857.
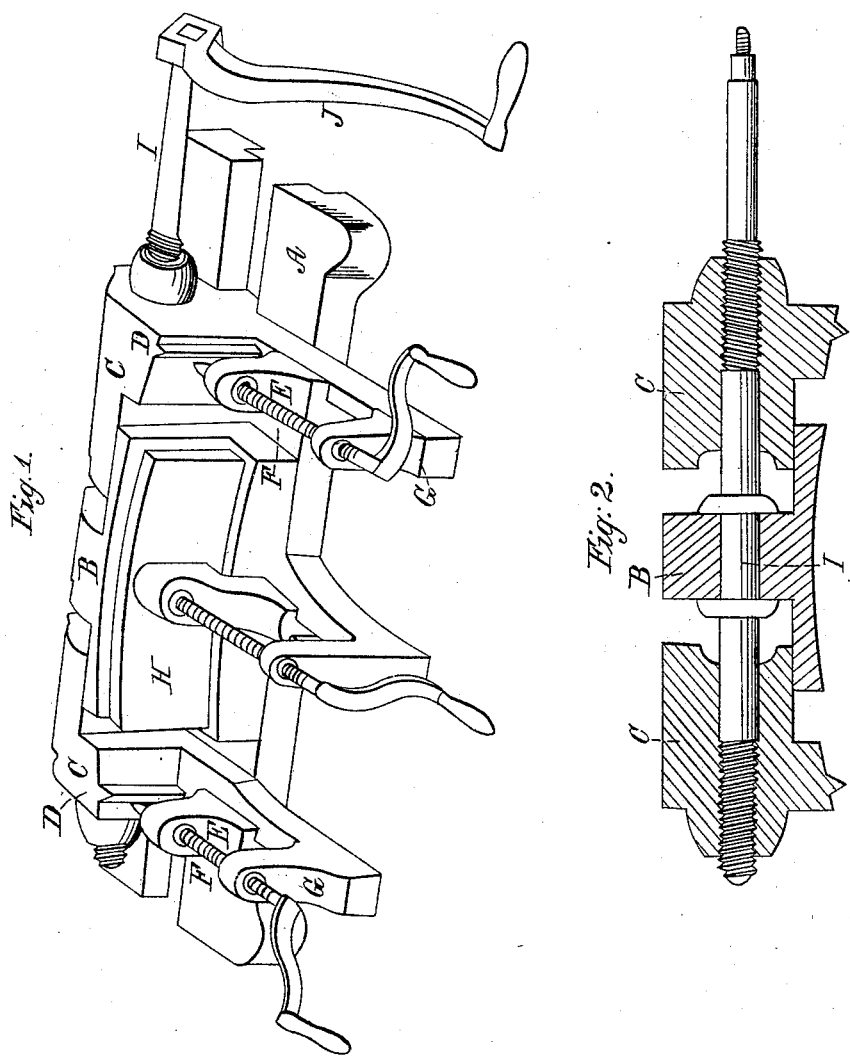
Witnesses
George Johnson
Rodewell Wagner
Inventor
Russell W. Gates

UNITED STATES PATENT OFFICE.

RUSSELL W. GATES, OF HOMER, MICHIGAN.

MACHINE FOR UPSETTING TIRES.

Specification of Letters Patent No. 16,331, dated January 6, 1857.

*To all whom it may concern:*

Be it known that I, RUSSELL W. GATES, of Homer, in the county of Calhoun and State of Michigan, have invented an Improved Machine for Upsetting Wagon-Tires; and I do hereby declare that the following is a full, clear, and exact description thereof, both of the construction and operation of the same, reference being had to the annexed drawings, making a part of this specification, in which—

Figure 1 is a perspective view, and Fig. 2, a sectional of the upsetting jaws and shaft.

The same letters refer to like parts.

I usually construct my improved machines for upsetting tire as follows: On the center of a bed plate A Fig. 1 is cast a short vertical standard B (to receive a shaft bearing) which has a flange on each side of its face, of sufficient projection to form a guide plate of a slightly concave form, to secure the heated portion of the tire while upsetting. A rabbeted slot runs quite through this bed plate, from each side of the standard. C C are the upsetting or clamping blocks. They are also of cast iron, and are formed with a flanged tenon to slide freely in the rabbeted slot in the bed plate. The faces are formed to match the concavity in the guide plate and carries two steel spurs D D for dogging the tire. A bracketed leg extends from the bottom of each of these blocks, and resting on and projecting over the top of the bed plate, with a groove in the center, in which slides a jaw E E carrying a spur similar to D and exactly opposite it. These jaws are actuated by the screws F F, tapped in the brackets G G. A similar arrangement operates the follower H, which is a sliding plate adjusted by a screw to the thickness of the tire, which is inclosed by it and the guide plate. I is a shaft extending longitudinally with the bed plate. It carries a right and left threaded screw, which are either tapped into the clamping blocks, or work in nuts attached to them. This screw revolves in the bearing as shown in Fig. 2 and is revolved by the crank J.

The tire having been heated is placed between the jaws E E and clamping blocks C C where it is securely dogged by means of the screws F F. The follower H having been adjusted, the screw shaft I is revolved by the crank J, and causes the clamping blocks C C, to approach each other simultaneously, thus shortening the space between the dogged portions of the tire and of course upsetting it. The amount of such upsetting may be determined by a scale.

I am well aware that various devices are employed in machines for upsetting iron, such as compound levers, cams, screws etc., and therefore do not claim any of these things either single or in combination, but What I do claim as my invention and desire to secure by Letters Patent, is—

Use of the right and left threaded screw shaft I, constructed and arranged as described and operated in connection with the blocks C, C, for the purpose set forth.

RUSSELL W. GATES.

Witnesses:
   JOSEPH C. FUSIK,
   GEORGE JOHNSON.